United States Patent
Mahadevan et al.

(10) Patent No.: US 10,089,655 B2
(45) Date of Patent: *Oct. 2, 2018

(54) METHOD AND APPARATUS FOR SCALABLE DATA BROADCASTING

(71) Applicant: CISCO TECHNOLOGY, INC., San Jose, CA (US)

(72) Inventors: Priya Mahadevan, Sunnyvale, CA (US); Roger C. Meike, Emerald Hills, CA (US); Glenn C. Scott, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1030 days.

This patent is subject to a terminal disclaimer.

(21) Appl. No.: 14/092,680

(22) Filed: Nov. 27, 2013

(65) Prior Publication Data

US 2015/0149297 A1    May 28, 2015

(51) Int. Cl.
*G06Q 30/02* (2012.01)
*H04W 4/21* (2018.01)
(Continued)

(52) U.S. Cl.
CPC ......... *G06Q 30/0269* (2013.01); *G06F 21/10* (2013.01); *H04L 63/104* (2013.01);
(Continued)

(58) Field of Classification Search
CPC .................................................. G06Q 30/0269
(Continued)

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Intelligent Watermarking Techniques, Jeng-Shyang Pan, 2004, World Scientific Publishing, p. 574.*

(Continued)

*Primary Examiner* — David J Stoltenberg
*Assistant Examiner* — Michael I Ezewoko

(57) ABSTRACT

A data-publishing system facilitates broadcasting a data stream so that each client device obtains a personalized data stream. During operation, a publisher can generate an encoded data stream that does not include a reproducible version of the data stream's contents, and generates an encoding sauce to provide to at least one data-brokering system. When a broker receives a request from a client device for access to the data stream, the broker validates the client device's access to the data stream, and uses the encoding sauce to generate a secret sauce for the client device. The client device can process the encoded data stream using instructions in the secret sauce to produce a personalized data stream that includes a reproducible version of the data stream's contents.

20 Claims, 14 Drawing Sheets

(51) Int. Cl.
| | |
|---|---|
| *G06F 21/10* | (2013.01) |
| *H04N 21/2347* | (2011.01) |
| *H04N 21/239* | (2011.01) |
| *H04N 21/254* | (2011.01) |
| *H04N 21/258* | (2011.01) |
| *H04N 21/266* | (2011.01) |
| *H04N 21/2668* | (2011.01) |
| *H04N 21/462* | (2011.01) |
| *H04N 21/8358* | (2011.01) |
| *H04L 29/06* | (2006.01) |
| *H04W 4/20* | (2018.01) |

(52) U.S. Cl.
CPC ......... *H04L 65/00* (2013.01); *H04N 21/2393* (2013.01); *H04N 21/23476* (2013.01); *H04N 21/2541* (2013.01); *H04N 21/25816* (2013.01); *H04N 21/2668* (2013.01); *H04N 21/26613* (2013.01); *H04N 21/4622* (2013.01); *H04N 21/8358* (2013.01); *H04W 4/206* (2013.01); *H04W 4/21* (2018.02); *H04L 2463/101* (2013.01)

(58) Field of Classification Search
USPC ....................................................... 705/14.67
See application file for complete search history.

(56) References Cited

U.S. PATENT DOCUMENTS

| | | | |
|---|---|---|---|
| 4,921,898 A | 5/1990 | Lenney | |
| 5,070,134 A | 12/1991 | Oyamada | |
| 5,110,856 A | 5/1992 | Oyamada | |
| 5,506,844 A | 4/1996 | Rao | |
| 5,629,370 A | 5/1997 | Freidzon | |
| 5,870,605 A | 2/1999 | Bracho | |
| 6,052,683 A | 4/2000 | Irwin | |
| 6,091,724 A | 7/2000 | Chandra | |
| 6,173,364 B1 | 1/2001 | Zenchelsky | |
| 6,226,618 B1 * | 5/2001 | Downs ................ G06F 21/10 380/279 |
| 6,233,646 B1 | 5/2001 | Hahm | |
| 6,332,158 B1 | 12/2001 | Risley | |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,769,066 B1 | 7/2004 | Botros | |
| 6,772,333 B1 | 8/2004 | Brendel | |
| 6,862,280 B1 | 3/2005 | Bertagna | |
| 6,901,452 B1 | 5/2005 | Bertagna | |
| 6,917,985 B2 | 7/2005 | Madruga | |
| 6,968,393 B1 | 11/2005 | Chen | |
| 6,981,029 B1 | 12/2005 | Menditto | |
| 7,013,389 B1 | 3/2006 | Srivastava | |
| 7,031,308 B2 | 4/2006 | Garcia-Luna-Aceves | |
| 7,061,877 B1 | 6/2006 | Gummalla | |
| 7,206,860 B2 | 4/2007 | Murakami | |
| 7,233,948 B1 * | 6/2007 | Shamoon ....... H04N 21/234318 |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,382,787 B1 | 6/2008 | Barnes | |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,769,887 B1 | 8/2010 | Bhattacharyya | |
| 7,779,467 B2 | 8/2010 | Choi | |
| 7,801,177 B2 | 9/2010 | Luss | |
| 7,816,441 B2 | 10/2010 | Elizalde | |
| 7,831,733 B2 | 11/2010 | Sultan | |
| 7,908,337 B2 | 3/2011 | Garcia-Luna-Aceves | |
| 7,924,837 B1 | 4/2011 | Shabtay | |
| 7,953,885 B1 | 5/2011 | Devireddy | |
| 8,000,267 B2 | 8/2011 | Solis | |
| 8,010,691 B2 | 8/2011 | Kollmansberger | |
| 8,010,795 B2 | 8/2011 | Rowley | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,271,578 B2 | 9/2012 | Sheffi | |
| 8,312,064 B1 | 11/2012 | Gauvin | |
| 8,386,622 B2 | 2/2013 | Jacobson | |
| 8,467,297 B2 | 6/2013 | Liu | |
| 8,553,562 B2 | 10/2013 | Allan | |
| 8,572,214 B2 | 10/2013 | Garcia-Luna-Aceves | |
| 8,654,649 B2 | 2/2014 | Vasseur | |
| 8,665,757 B2 | 3/2014 | Kling | |
| 8,667,172 B2 | 3/2014 | Ravindran | |
| 8,688,619 B1 | 4/2014 | Ezick | |
| 8,699,350 B1 | 4/2014 | Kumar | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,862,774 B2 | 10/2014 | Vasseur | |
| 8,903,756 B2 | 12/2014 | Zhao | |
| 8,937,865 B1 | 1/2015 | Kumar | |
| 9,071,498 B2 | 6/2015 | Beser | |
| 9,112,895 B1 | 8/2015 | Lin | |
| 9,203,816 B2 * | 12/2015 | Brueck ............. H04N 21/2541 |
| 9,532,113 B2 * | 12/2016 | Thorwirth ........ H04N 21/23439 |
| 2002/0010795 A1 | 1/2002 | Brown | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0176404 A1 | 11/2002 | Girard | |
| 2002/0188605 A1 | 12/2002 | Adya | |
| 2002/0199014 A1 | 12/2002 | Yang | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0074472 A1 | 4/2003 | Lucco | |
| 2003/0097447 A1 | 5/2003 | Johnston | |
| 2003/0140257 A1 | 7/2003 | Peterka | |
| 2004/0024879 A1 | 2/2004 | Dingman | |
| 2004/0030602 A1 | 2/2004 | Rosenquist | |
| 2004/0073715 A1 | 4/2004 | Folkes | |
| 2004/0139230 A1 | 7/2004 | Kim | |
| 2004/0221047 A1 | 11/2004 | Grover | |
| 2004/0225627 A1 | 11/2004 | Botros | |
| 2004/0252683 A1 | 12/2004 | Kennedy | |

(56) References Cited

U.S. PATENT DOCUMENTS

| | | |
|---|---|---|
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0038578 A1 | 2/2007 | Liu et al. |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |

(56) References Cited

U.S. PATENT DOCUMENTS

| | | |
|---|---|---|
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0117659 A1 | 5/2012 | Gearhart et al. |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0246803 A1 | 9/2013 | Vale et al. |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Cognition—From Memory to Creativity, Weisberg, Reeves, 2013, John Wiley & Sons, pp. 13-40, 519-527.*
Microsoft Computer Dictionary, Fifth Edition, 2002, Microsoft Press, p. 23.*
Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Explaining Creativity, Keith Sawyer, 2006, Oxford University Press, pp. 104-105.*
The Way We Think, Fauconnier, 2010, Persues Books Group, Chapter 1, Chapter 13.*
Creativity and Artificial Intelligence, Francisco Camara Pereira, Mouton de Gruyter, 2007, pp. 51-62.*

(56) References Cited

OTHER PUBLICATIONS

Mental Spaces, Gilles Fauconnier, Cambridge University Press, 1998, pp. xxviii-xxix.*
Contemporary Cryptography, Oppliger, Artech House, 2004, pp. 21-43.*
Digital Rights Management, Feigenbaum, Springer-Verlag, 2003, pp. 32-136.*
Security Technologies for the World Wide Web, Oppliger, Artech House, 2003: pp. 87-115, 185-247.*
Intelligent Watermarking, Jeng-Shyang Pan, World Scientific Publishing Co., 2004, p. 1-39.*
HCI remixed : reflections on works that have influenced the HCI community, MIT Press, 2008: pp. 275-279.*
Why a Diagram is (Sometimes) Worth Ten Thousand Words, Larkin, Simon, Cognitive Science, 1987, pp. 65-100.*
Streetlights and Shadows, MIT Press, 2009, pp. 33-47.*
The future of the internet—and how to stop It, Yale University Press, 2008, Chapter(s) 1-9, [emphasis pp. 11-18].*
Introduction to Modern Cryptography, Katz, Chapman and Hall/ CRC, 2008, pp. 3-28.*
Information Hiding, Katzenbeisser, Artech House, 2000, pp. 1-148.*
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library-Pairing-Based Cryptography—About," http://crypto.stanford.edu/pbc.downloaded Apr. 27, 2015.
C. Gentry and A. Silverberg. Hierarchical ID-Based Cryptography. Advances in Cryptology—ASIACRYPT 2002. Springer Berlin Heidelberg (2002).
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer Science vol. 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (Pursuit)," http://www.fp7-pursuit.ew/ PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and counter-measures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.

(56) References Cited

OTHER PUBLICATIONS

Content Mediator Architecture for Content-aware Networks (COMET) Project [online], http://www.comet-project.org/, Downloaded Mar. 9, 2015.

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hoque et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

V. Jacobson et al., 'Networking Named Content,' Proc. IEEE CoNEXT '09, Dec. 2009.

Jacobson, Van et al., "Content-Centric Networking, Whitepaper Describing Future Assurable Global Networks", Palo Alto Research Center, Inc., Jan. 30, 2007, pp. 1-9.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

Koponen, Teemu et al., "A Data-Oriented (and Beyond) Network Architecture", SIGCOMM '07, Aug. 27-31, 2007, Kyoto, Japan, XP-002579021, p. 181-192.

L. Wang et al., 'OSPFN: An OSPF Based Routing Protocol for Named Data Networking,' Technical Report NDN-0003, 2012.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. H Balakrishnan, and S. Shenker, "Untangling the web from DNS," in Proc. USENIX NSDI 2004, Oct. 2010, pp. 735-737.

Mahadevan, Priya, et al. "Orbis: rescaling degree correlations to generate annotated internet topologies." ACM SIGCOMM Computer Communication Review. vol. 37. No. 4. ACM, 2007.

(56) References Cited

OTHER PUBLICATIONS

Mahadevan, Priya, et al. "Systematic topology analysis and generation using degree correlations." ACM SIGCOMM Computer Communication Review. vol. 36. No. 4. ACM, 2006.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

McWilliams, Jennifer A., and Iain S. Walker. "Home Energy Article: A Systems Approach to Retrofitting Residential HVAC Systems." Lawrence Berkeley National Laboratory (2005).

Merindol et al., "An efficient algorithm to enable path diversity in link state routing networks", Jan. 10, Computer Networks 55 (2011), pp. 1132-1140.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans. on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, no. 4, pp. 181-192, Oct. 2007.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014}: 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network and Computer Applications 35 (2012) 221-229.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

(56) References Cited

OTHER PUBLICATIONS

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hogue et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Extended European Search Report in counterpart European Application No. 14193317.6, dated Feb. 25, 2015, 10 pages.

Ahlgren, et al., "A Survey of Information-Centric Networking," IEEE Communications Magazine, vol. 50, Issue 7, Jul. 2012, 11 pages.

Kocher, et al., "Self-Protecting Digital Content," A Technical Report from the CRI Content Security Research Initiative, Feb. 2004, retrieved from https://www.rambus.com/wp-content/uploads/2015/08/SelfProtectingContent.pdf, 14 pages.

* cited by examiner

METHOD AND APPARATUS FOR SCALABLE DATA BROADCASTING

BACKGROUND

Field

This disclosure is generally related to publishing digital content. More specifically, this disclosure is related to controlling access to a data stream over a network, such as the Internet, an Information Centric Network (ICN), a client-server architecture, a peer-to-peer network, etc.

Related Art

In the modern digital economy, content producers can publish their content in digital form through one or more streaming or broadcasting services to earn revenue through various revenue models. Music producers, for example, oftentimes license their music to online streaming radio stations that earn money by broadcasting advertisements to their listeners over a computer network. The music producers may also license their music content to music recommendation services that tailor song and advertisement selections to each consumer (e.g., the Pandora streaming service from Pandora Media Inc.).

Similarly, movie and television-show producers can license their digital content to video streaming services that allow consumers to view movies or shows over the Internet. Some of these video streaming services negotiate a licensing fee with each producer, and earn revenue by charging consumers a flat monthly fee (e.g., Netflix, Inc.), and/or by presenting advertising commercials to consumers (e.g., Hulu.com).

These streaming services typically attempt to secure a publisher's digital content by requiring their customers to use the service's custom software application to receive the media stream. Netflix and Hulu, for example, deploy proprietary video streaming applications that make it difficult for a user to illegally copy a media stream by not allowing the user to "save" the media stream to a local disc. However, it is possible for consumers to use third-party applications that snoop on network traffic in order to save the media stream to disc. Once the consumer has saved a copy of the media stream, it is possible for the consumer to illegally share the media stream anonymously given that the media streaming service typically transmits identical copies of the media stream to many consumers.

Cable and Satellite broadcasting companies, on the other hand, provide traditional television broadcasts to consumers over a secured digital infrastructure. A broadcasting company typically provisions a consumer's client device (e.g., as a set-top box device) when the consumer subscribes to a service from the broadcasting company. This provisioning process verifies that the client device is associated with a paying customer, and configures the device to detect and present the broadcasted media to the paying customer.

These broadcasting companies typically encrypt each media stream using a stream-specific key before broadcasting each media stream to a group of subscribers. Each client device receives a key from the broadcasting company (e.g., periodically), and uses the key to decrypt the media stream just before presenting the media stream to the user. However, it is possible for a consumer to save the broadcasted media stream to disk once the media stream has been decrypted, for example, by using a high-definition multimedia interface (HDMI) capture card on a computer. Also, because the broadcasting company transmits the same media stream to the group of consumers, it is possible for the consumer to duplicate and illegally share the media stream with others anonymously.

SUMMARY

One embodiment provides a data-publishing system that facilitates broadcasting a data stream to a plurality of authorized client devices. A publisher can protect the data stream from unauthorized access by converting the data stream into an encoded data stream that by itself cannot be used to reproduce the original data stream. The publisher can also generate an "encoding sauce" that includes instructions for converting the encoded data stream into a new stream that can be used by authorized users.

The publisher can designate one or more brokers to authorize user access to the data stream. A broker can receive a request for the data stream from a user, and can process the request to obtain authorization or identification information for the user. If the user can be allowed to access the data stream, the broker can grant the user access to the data stream by generating a "secret sauce" that the user's computing device can use to decode the encoded data stream. In some embodiments, the broker does not need to generate a unique secret sauce from the base sauce. For example, some encoded data streams might not need a secret sauce to decode the stream. The broker can forward the encoding sauce to a client device, which allows the client device to process the encoded data stream to reproduce the original data stream (whose contents are not personalized for each client).

When the user's client device requests the data stream from the publisher, the publisher can redirect the client device to a broker that controls access to the data stream's contents. The client device can obtain the encoded data stream from the publisher (or from any other source), and obtains a secret sauce stream from the broker. The client device processes the encoded data stream using the secret sauce stream to produce a personalized data stream that includes the data stream's contents.

The following terms describe elements of a data-publishing system:

Data Stream: A collection of data that is to be published. Examples include an audio file, a video stream, a data file, an executable file, etc.

Base Sauce: Instructions for generating an encoded data stream, and for generating an encoding sauce that can be provided to a trusted broker that processes requests for the data stream.

Encoded Data Stream: A collection of data that can be provided to any client device, a cache, or any computer in a network. Client devices cannot decode the original data stream directly from the encoded data stream alone.

Encoding Sauce: Instructions for generating a secret sauce that is typically unique to a client device or incorporates a unique client identifier (ID), etc.

Secret Sauce: Instructions for modifying an encoded data stream to produce a personalized data stream that is tailored to the requesting client device or ID.

Personal Data Stream: A collection of data whose contents may be personalized to the requesting client device or user. The personalized data stream can include digital watermarks that encode a unique identifier for the client device or ID. The personalized data stream's contents can also include additional data that is tailored to the client device or its user.

When the publisher selects or obtains a new data stream to publish, the publisher generates an encoded data stream that does not include a reproducible version of the data stream's contents. The publisher can also generate an encoding sauce that indicates instructions for generating a data-decoding secret sauce for a target entity, which the target entity can use to convert the encoded data stream into a personalized data stream. The publisher can then provide the encoding sauce to at least one broker, which facilitates the broker to make the data stream available to one or more entities.

In some embodiments, the data stream can include an audio stream, a video stream, a data file, a binary executable file, and/or a collection of Content Objects.

In some embodiments, while generating the encoded data stream, the publisher generates a base sauce for encoding the data stream, and generates the encoded data stream by applying the base sauce to the data stream. The base sauce indicates operations for modifying the data stream to produce an encoded data stream that does not include a reproducible version of the data stream's contents.

In some embodiments, the base sauce can include instructions indicating a cypher algorithm for encoding the data stream, and/or instructions for removing one or more data segments from the data stream.

In some embodiments, the encoding sauce can include instructions indicating a cypher algorithm for decoding the encoded data stream. The encoding sauce can also include instructions for inserting one or more data segments into the data stream, and/or instructions for embedding into the personalized data stream a digital watermark corresponding to the target entity.

In some embodiments, the publisher can disseminate the encoded data stream to one or more client devices via an information-centric network, a multicast data stream, a peer-to-peer computer network, and/or a cache server or a content delivery network (CDN).

In some embodiments, the publisher can receive a request for the data stream from a client device, and can determine a broker that is to provide the client device access to the data stream. The publisher can then return a stream-referencing packet that indicates which broker is to satisfy the client device's request.

In some embodiments, the publisher can analyze a pirated data stream to determine a person or organization that has allowed the data stream to be shared illegally. For example, the publisher can obtain a personalized data stream that is being distributed illegally, and obtains an encoding sauce which corresponds to the personalized data stream. The encoding sauce can indicate instructions that were used to embed the client device's identifier into the personalized data stream. The broker can then determine the client device's identifier from the personalized data stream by processing the personalized data stream based on the base sauce instructions.

One embodiment provides a data-brokering system (hereinafter referred to as a "broker") that can generate a secret sauce that allows a client device to access a data stream. During operation, the broker can obtain an encoding sauce from the publisher corresponding to a data stream, such that the encoding sauce indicates instructions for generating a data-decoding secret sauce for a target entity. The broker can receive a request for the data stream from a client device, at which point the broker determines whether the client device has access to the data stream. Responsive to validating the client device's access to the data stream, the broker generates a secret sauce for the client device, and provides the secret sauce to the client device. The secret sauce indicates instructions for modifying an encoded data stream to produce a personalized data stream that includes a usable version of the data stream's contents.

In some embodiments, the data stream can include a media stream, and the secret sauce can include instructions for generating a personalized data stream that includes a portion of the media stream.

In some embodiments, the request can include an Interest for the secret sauce that the broker receives over an information-centric network. The broker can provide the secret sauce to the client device by returning a Content Object that satisfies the Interest, and that includes the secret sauce.

In some embodiments, while validating the client device's access to the data stream, the broker can determine whether the client device is subscribed to the data stream, whether the client device has paid for the data stream, and/or whether the client device has viewed a sufficient number of advertisements for obtaining at least a portion of the data stream.

In some embodiments, while generating the secret sauce, the broker can generate at least one data segment that is to be inserted into the data stream to produce a personalized data stream for the client device. The broker then generates the secret sauce to include the data segment, and to include instructions for inserting the data segment into an encoded data stream to produce the personalized data stream.

In some variations to these embodiments, the data segment that is to be inserted into the data stream can include a watermark that indicates an identifier for the client device, an audio stream, a video stream, an advertisement, and/or an image that is to be overlaid over a portion of a video frame of the data stream.

In some embodiments, while obtaining the encoding sauce, the broker can receive the encoding sauce from a data-publishing server that publishes the data stream. The broker can also receive the encoding sauce from a remote data-brokering server that assigns the encoding sauce to one or more sub-brokers.

BRIEF DESCRIPTION OF THE FIGURES

In the figures, like reference numerals refer to the same figure elements.

DETAILED DESCRIPTION

Figure 1:
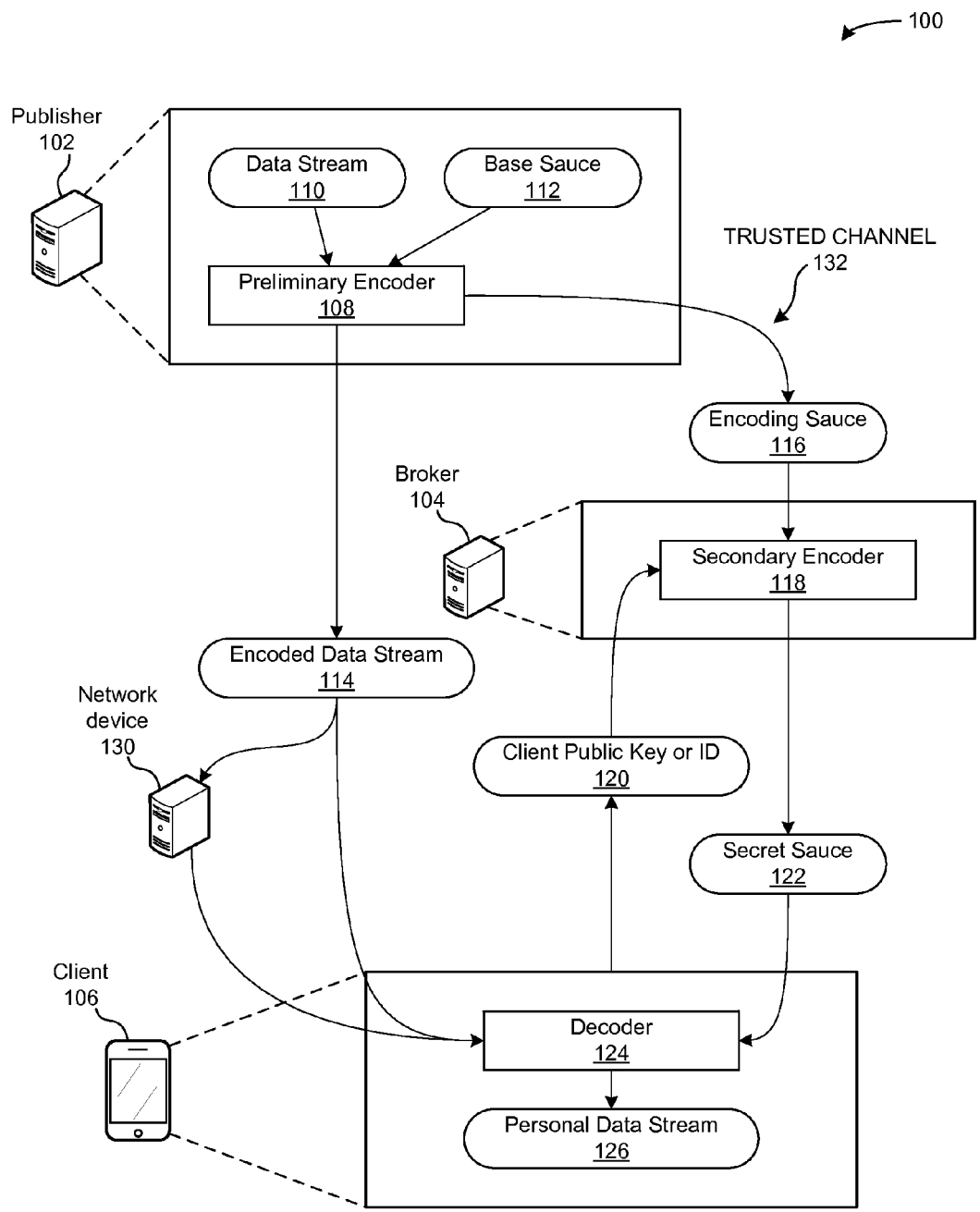
FIG. 1 illustrates an exemplary computing environment that facilitates brokering access to digital content in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a data-publishing system that solves the problem of broadcasting a data stream across a computer network, while only allowing authorized devices to use the data stream. A data publisher can use the data-publishing system to publish a data stream so that each authorized recipient obtains a personalized version of the data stream. The data stream can include a live video or audio stream, a recorded video or audio stream, an executable file (e.g., binary code), a digital document or image, etc.

For example, a publisher can broadcast a live or pre-recorded media stream to a plurality of consumers in a secure way by encoding or damaging the media stream so that the stream's contents cannot be reproduced from the encoded stream alone. The publisher also configures one or more brokers to control access to the media stream by providing these brokers with an encoding "sauce" that indicates how to decode or fix the media stream in a way that generates a personalized stream for each recipient.

A broker can use the encoding sauce to generate a secret sauce for each valid recipient of a data stream. Each recipient's client device can receive segments of the encoded data stream from the publisher itself, and/or from any other network device that has cached the encoded data stream segments. These devices then use the secret sauce that they may have obtained from the broker to decode or fix the encoded data stream in a way that personalizes the data stream for that recipient. In some embodiments, a personalized data stream can include a digital watermark that encodes an identifier of the stream's intended recipient. This allows a publisher to analyze a pirated data stream, such as a movie, to determine who has allowed the data stream to be copied illegally.

In some embodiments, the publisher can generate the encoded data stream by extracting a plurality of small data segments that are critical for presenting or otherwise making use of the data stream. These extracted data segments can be provided to a client device via a secret sauce stream that requires a significantly lower bandwidth than the encoded data stream. The secret sauce stream can include instructions which indicate how the extracted data segments are to be inserted back into the encoded data stream. For example, these instructions can map each data segment of the secret sauce stream to a byte offset of the encoded data stream. The client device can receive the high-bandwidth encoded data stream from the publisher or from a data-cache over an information centric networking (ICN) system, or through any computer network now known or later developed. Also, the client device can receive the low-bandwidth secret sauce stream from the broker, or from any other entity which the broker has designated to generate and/or disseminate secret sauce streams for a given set of users or client devices.

FIG. 1 illustrates an exemplary computing environment 100 that facilitates brokering access to digital content in accordance with an embodiment. Environment 100 can include publishers, brokers, and client devices, which can each be coupled to any wired or wireless computer network now known or later developed. A publisher 102 can publish a data stream as an encoded data stream, and only authorized clients can get access to the secret sauce from the broker. Any client device can access the encoded data stream directly from the publisher, or from any other devices that store a copy of the encoded data stream (e.g., a cache, or other network devices). However, only authorized devices (e.g., client device 106) can use the secret sauce to convert the encoded data stream into a personalized data stream. The encoded data stream is itself useless to client devices that do not have a valid secret sauce for decoding the stream.

Publisher 102 can include a primary encoder 108 that uses a base sauce 112 to encode a data stream 110. Base sauce 112 can be specific to data stream 110, or can be re-used for a plurality of data streams from publisher 102. Base sauce 112 can include instructions for generating an encoded data stream 114, and for generating an encoding sauce 116 that can be provided to a trusted broker that processes requests from clients for the data stream. Encoded data stream 114 can include a collection of data objects that can be provided to any client device or computer in a network, without the risk of revealing the data stream's contents to unauthorized users. A user's client device cannot decode the original data stream from encoded data stream 114 alone.

Publisher 102 uses base sauce 112 to generate encoded sauce 116 for encoded data stream 114, and provides encoding sauce 116 to a broker 104 over a trusted channel 132. Encoding sauce 116 can include instructions used by broker 104 for generating a "secret sauce" for a client device that has valid privileges. Broker 104 is responsible for granting access to secret sauce 122 only to users that have valid access privileges.

In some embodiments, broker 104 can include a secondary encoder 118 that uses encoding sauce 116 to generate secret sauce 122 for client 106. Secondary encoder 118 can generate secret sauce 122 for client 106 in advance (e.g., before receiving a request for secret sauce 122), or in response to receiving a request from client 106. For example, when client device 106 requests data stream 110 from publisher 102, publisher 102 can respond to the request by providing encoded data stream 114 to client 106, and redirecting client 106 to request access to encoded data stream 114 from broker 104. In some embodiments, client device 106 can obtain encoded data stream 114 from any network device 130 that stores encoded data stream 114, such as a cache sever, a CDN server, or any peer-2-peer device.

Client 106 then sends a request to broker 104, which requests access to encoded data stream 114, and includes a client public key or identifier (ID) or any other form of authentication such as user-id/password, for client 106.

If broker 104 determines that client 106 has valid access privileges, secondary encoder 118 can use encoding sauce 116 to generate secret sauce 122 based on the public key or the ID for client 106 for client 106. Secret sauce 122 includes instructions for modifying encoded data stream 114 to produce a personalized data stream 126 that is tailored to client 106. Broker 104 then sends secret sauce 122 to client 106.

Client 106 includes a decoder 124 that processes encoded data stream 114 using secret sauce 122 to generate personalized data stream 126. Personalized data stream 126 can include a stream or collection of data objects whose contents may be personalized to client 106 or a user of client 106. Personalized data stream 126 can include digital watermarks that encode a unique ID for client 106 or its user, and/or can include additional data that is tailored to the client device or its user.

In some embodiments, a publisher can broadcast an encoded data stream to a plurality of devices over an information-centric network. In ICN, all content is named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms describe elements of an ICN architecture, such as a named-data network (NDN) or a content-centric network (CCN):

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in an ICN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which ICN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

Figure 2:
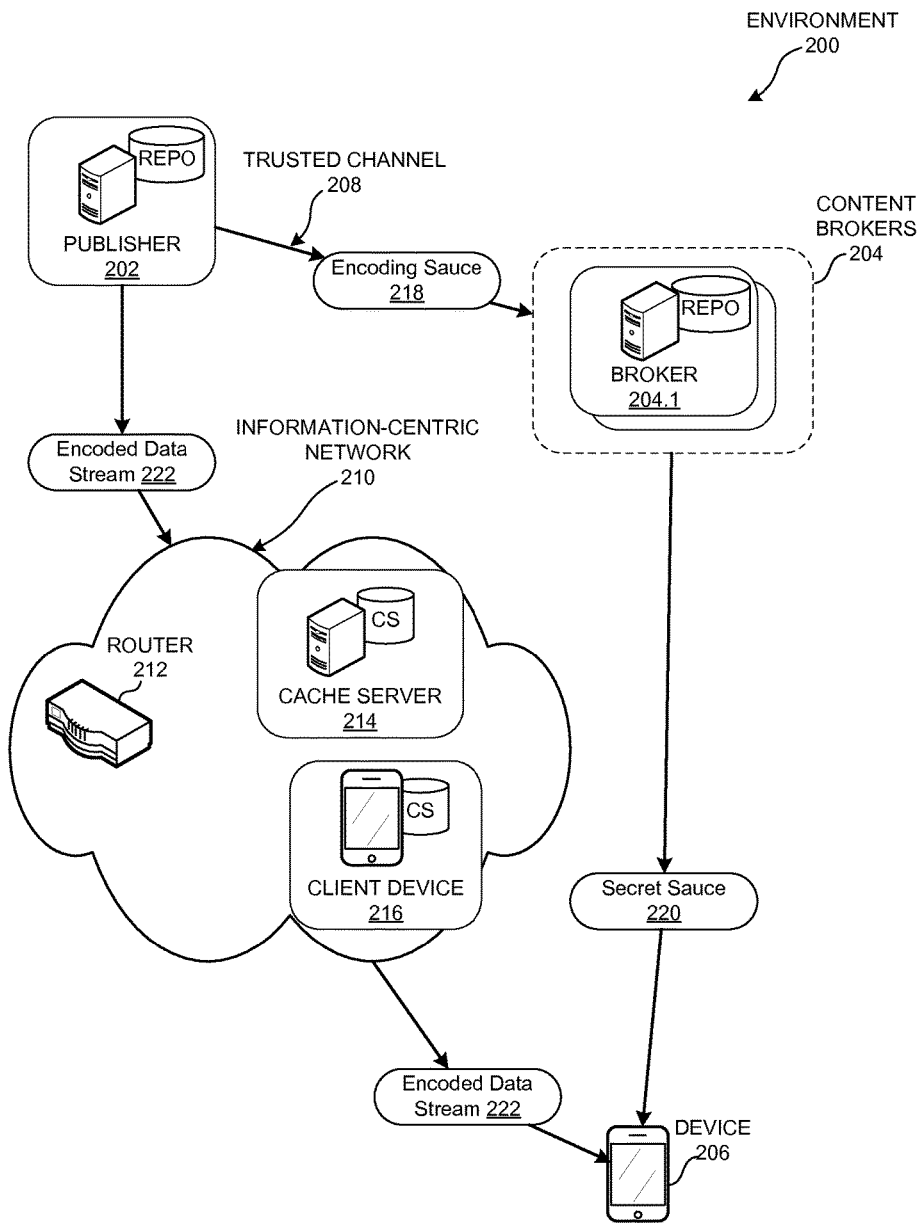
FIG. 2 illustrates an exemplary computing environment that facilitates brokering access to digital content over an information-centric network in accordance with an embodiment.

FIG. 2 illustrates an exemplary computing environment 200 that facilitates brokering access to digital content over an information-centric network 210 in accordance with an embodiment. Environment 200 can include a publisher that publishes a data stream, and one or more brokers 204 that control access to the data stream. Specifically, publisher 202 can include a computing device that disseminates an encoded data stream 222 over an information-centric network 110.

Publisher 202 can publish the data stream by generating an encoded data stream 222, and disseminating encoded data stream 222 over information-centric network 210. Encoded data stream 222 may be encoded, for example, by extracting every $n^{th}$ byte (e.g., $100^{th}$ byte) from the original data stream. Publisher 202 can also generate an encoding sauce 218 for encoded data stream 222, and can provide encoding sauce 218 to one or more of brokers 204 over a trusted channel 208 (e.g., a secure network connection or a tangible storage device). Publisher 202 can encrypt encoding sauce 218 using a public key from a broker 204 (or using a private key that belongs to publisher 202), and can sign encoding sauce 218 using a digital certificate. Encoding sauce 218 can include the data segments that have been extracted from the original data stream (e.g., every $100^{th}$ byte of the original data stream), as well as instructions indicating how these data segments are to be re-inserted into encoded data stream 222. Encoding sauce 218 can also indicate instructions for modifying one or more of the extracted data segments to generate digital watermarks for a user.

In some embodiments, environment 200 can also include a client device 206 that can obtain encoded data stream 222 via information-centric network 210, and can obtain a secret sauce 220 for the data stream from broker 204.1 either via information-centric network 210 or via any other computer network now known or later developed. Client device 206 can include a smartphone, a tablet computer, or any other computing device such as a laptop computer, a desktop computer, etc. To obtain encoded data stream 222, device 206 can disseminate a request or an Interest for encoded data stream 222 over information-centric network 210. Publisher 202 can satisfy the request or Interest by returning a packet that includes a unique name for encoded data stream 222, and identifies a broker (e.g., broker 204.1) that is to control access to the data stream.

In some embodiments, client device 206 can disseminate one or more Interests for encoded data stream 222, such that each Interest corresponds to a portion of encoded data stream 222. The Interest may be satisfied by publisher 202, or by any device within information-centric network 210. For example, in some embodiments, one or more of the Content Objects for encoded data stream 222 may be cached within a content store (CS) within a router 212, a cache server 214, and/or a peer client device 216. Recall that encoded data stream 222 itself cannot be used to reproduce the data stream's contents. Hence, in some embodiments, any device within information-centric network 210 can cache Content Objects for encoded data stream 222 without sacrificing its security, which reduces the number of Interests which need to be processed by publisher 202.

Client device 206 can gain access to the contents of encoded data stream 222 by disseminating one or more Interests for the data stream's secret sauce stream. Broker 204.1 can use the publisher's encoding sauce to generate secret sauce Content Objects that satisfy these Interests (e.g., secret sauce 220), and that are customized for client device 206. Broker 204 can encrypt each secret sauce Content Object using a public key from a client device 206, and can sign these Content Objects using a local digital certificate. Client device 206 then processes encoded data stream 222 using the secret sauce stream (e.g., secret sauce 220) to generate a personalized data stream for the user.

In some embodiments, broker 204.1 generates a plurality of secret sauce objects for the data stream, such that each secret sauce object decodes a portion of the encoded data stream. For example, broker 204.1 can generate a secret sauce object for each of the encoded data stream's Content Objects or for a set of media segments. As another example, if the encoded data stream corresponds to a media stream, publisher 202 can partition the media stream into a plurality of media segments, and broker 204.1 can generate a secret sauce Content Object for each media segment. This way, broker 204.1 can require device 206 to display a set of commercials before receiving a secret sauce object for a subsequent segment of the encoded media stream that are to be presented after the commercials.

Further, given that the broker needs to generate a secret sauce stream for each client device that has valid access to the data stream, the broker can restrict access to the data stream based on pre-determined data-restricting criteria, and can keep track of various data-access analytics for various data streams. For example, the broker can restrict access to only client devices that have purchased the data stream, that have subscribed into a data-streaming service (e.g., an online video streaming service, such as Netflix), and/or that belong or do not belong to a predetermined demographic (e.g., the recipient does not meet an 18-year old age requirement).

The broker can also keep track of which client devices have accessed which data streams, how much of a data stream they have accessed, consumer demographic information for each data stream, etc. When the data stream corresponds to a media stream, the broker can also keep track of which advertisements have been viewed during each media stream or by each consumer, a revenue amount that has been generated from each media stream or from each consumer, etc. The broker can use these analytics to bill users for the data streams they have accessed, to bill users for a tiered subscription service to various data streams, to determine a user's stream-preference information, etc. Also, given that each secret sauce stream can include executable instructions, the broker can use the secret sauce stream and analytics information to insert user-targeted advertisements into the media stream presented by the client device.

Data Publisher

Any entity (e.g., a person or organization) that generates or owns digital content can utilize the data-publishing system (also referred to herein as a "publisher") to make the digital content available to others. These entities may include a film maker or movie producer that owns various movies or television programs, a musician or music producer, a software developer, etc. The data publisher can generate encoded data streams for his digital content, and generate an encoding sauce that allows a broker to control access to the digital content.

Figure 3:
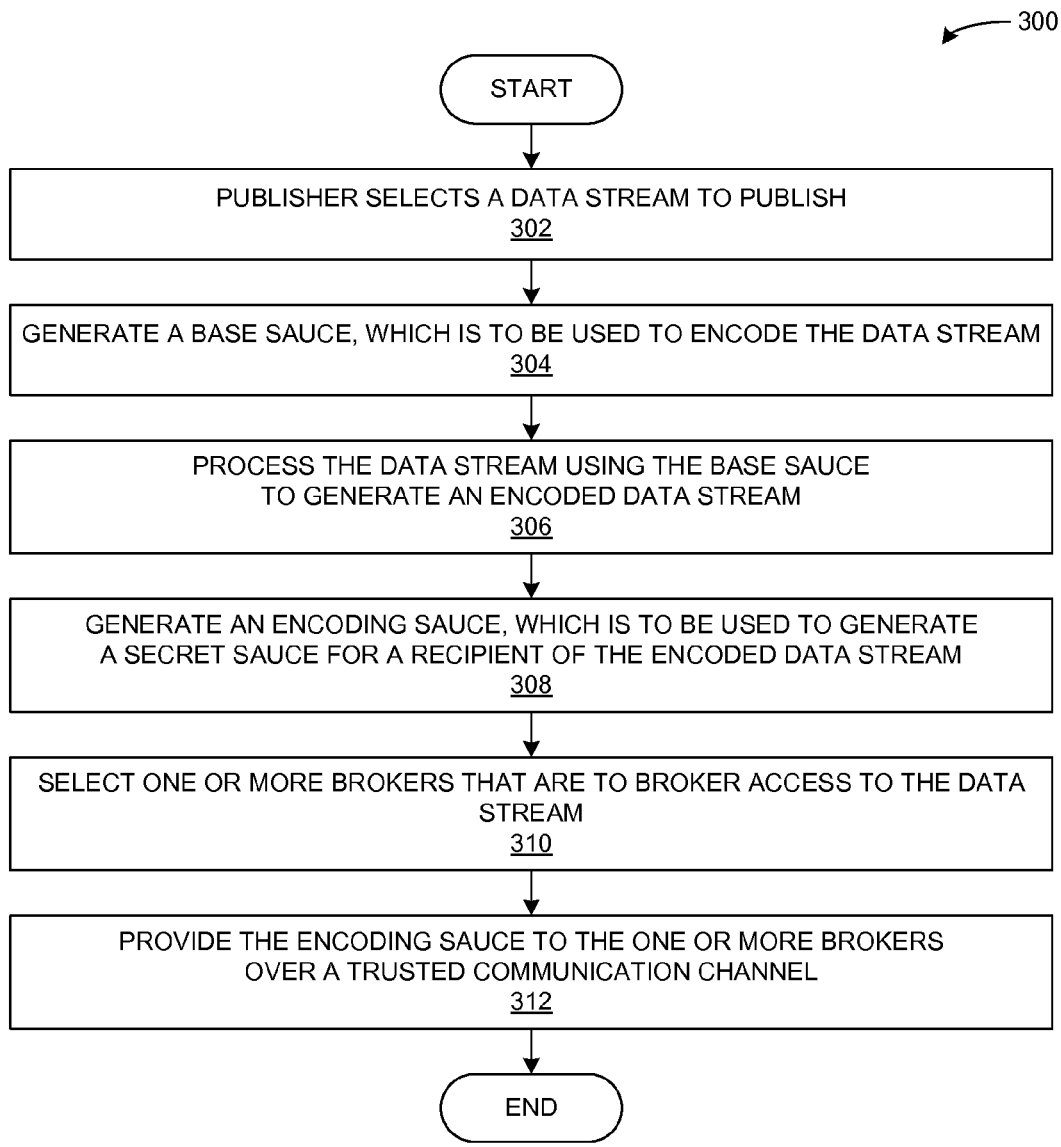
FIG. 3 presents a flow chart illustrating a method for publishing a data stream in accordance with an embodiment.

FIG. 3 presents a flow chart illustrating a method 300 for publishing a data stream in accordance with an embodiment. During operation, the publisher selects a data stream to publish (operation 302), and generates a base sauce that can be used to encode the selected data stream (operation 304). The base sauce can include instructions that generate an encoded data stream, for example, by extracting one or more data segments from the base data stream. The publisher then processes the data stream using the base sauce to generate the encoded data stream (operation 306), and can cache the encoded data stream locally, or on a remote data repository. In some embodiments, the publisher can receive a request or an Interest for the data stream from a client device, and the publisher can return the encoded data stream to satisfy the request or the Interest. In some other embodiments, a client device can disseminate a request or Interest for the encoded data stream across an information-centric network, and receives the encoded data stream from the media repository, an intermediate cache, or any peer network device that can satisfy the request or Interest.

The publisher also generates an encoding sauce for the data stream (operation 308). This encoding sauce includes instructions that allow a data broker to generate a secret sauce for a recipient of the encoded data stream. In some embodiments, the encoding sauce specifies instructions for generating watermarks that encode a recipient's identifier, and specifies locations of the data stream where these watermarks are to be inserted. The publisher can select one or more brokers that are to broker access to the data stream (operation 310), and provides the encoding sauce to the one or more brokers (operation 312). In some embodiments, the publisher can provide the encoding sauce to a broker over a secure channel. Also, in some embodiments, the broker can designate one or more additional sub-brokers that are to control access to the data stream. Each sub-broker may, for example, be configured to respond to requests from a particular geographic region, from a given set of client devices, etc.

Figure 4:
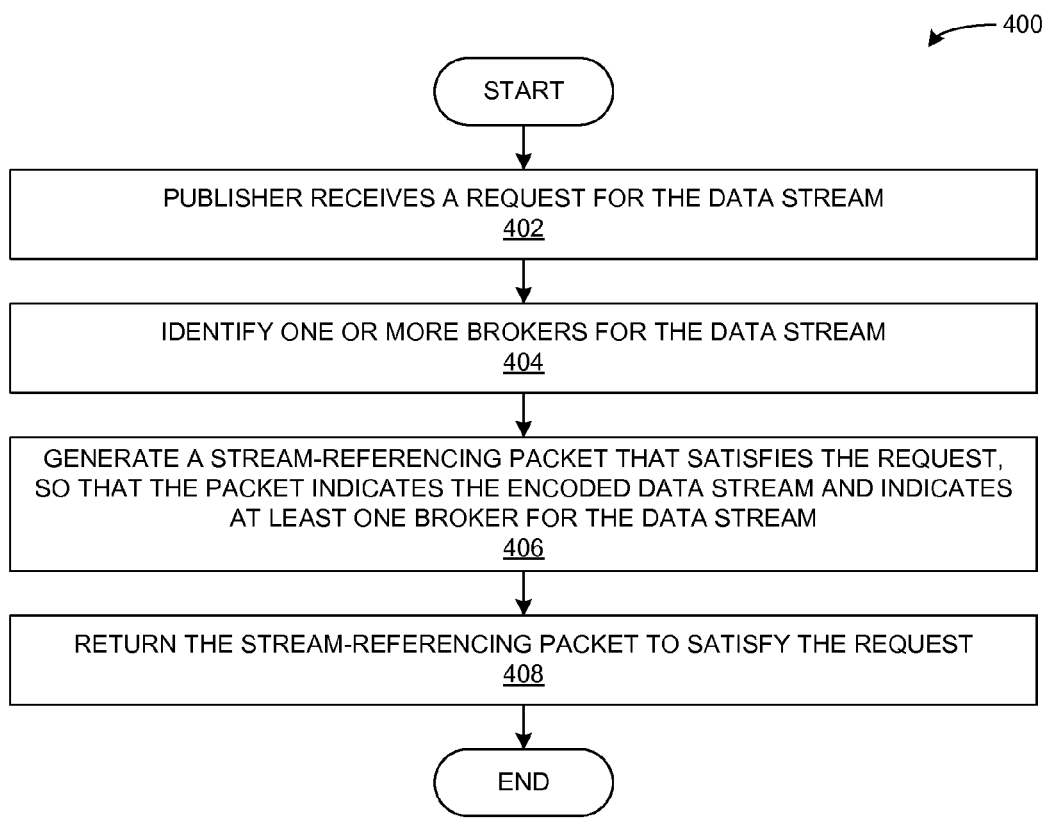
FIG. 4 presents a flow chart illustrating a method for assigning a broker to a data-consuming client device in accordance with an embodiment.

FIG. 4 presents a flow chart illustrating a method 400 for assigning a broker to a data-consuming client device in accordance with an embodiment. During operation, the publisher can receive a request for a data stream (operation 402), and identifies one or more brokers which have been provisioned to broker access to the data stream (operation 404). The request can include an Interest received over a named-data network. To satisfy the request, the publisher generates a stream-referencing packet that includes a name of the encoded data stream and/or includes at least a portion of the data stream. The stream-referencing packet also includes at least one broker for the data stream (operation 406). The publisher then returns the stream-referencing packet to satisfy the request or Interest (operation 408). The stream-referencing packet can include a Content Object that is returned over a named-data network to satisfy an Interest message.

In some embodiments, a publisher can analyze a pirated copy of the data stream that has been illegally copied to identify the copy's first recipient.

Figure 5:
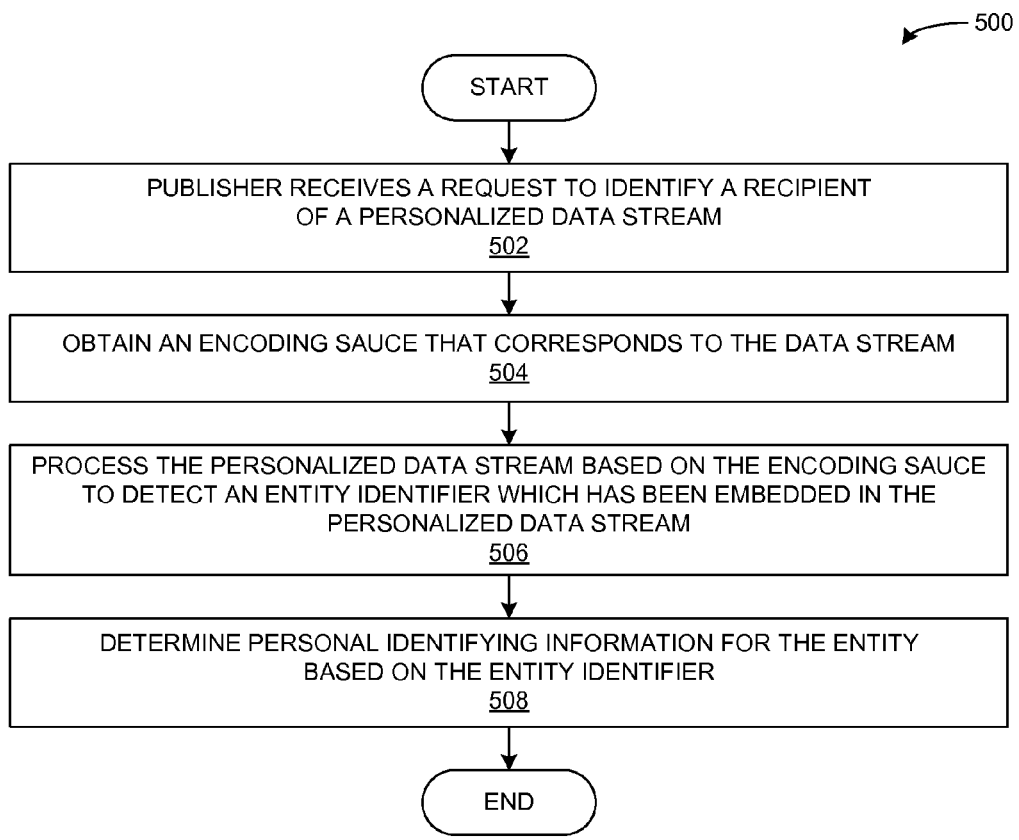
FIG. 5 presents a flow chart illustrating a method for identifying an entity for whom a given personalized data stream was generated in accordance with an embodiment.

FIG. 5 presents a flow chart illustrating a method 500 for identifying an entity for whom a given personalized data stream was generated in accordance with an embodiment. During operation, the publisher can receive a request to identify a recipient of a personalized data stream (operation 502), and obtains an encoding sauce that corresponds to the data stream (operation 504). Recall that the encoding sauce can indicate instructions for generating and inserting digital watermarks into the data stream. The publisher processes the personalized data stream based on the instructions in the encoding sauce to detect an entity identifier from digital watermarks that have been embedded in the personalized data stream (operation 506).

For example, the secret sauce may have configured a client device to perform an exclusive-OR (XOR) operation between a user's unique identifier and various segments of the base data stream to generate various watermarks for the personalized data stream. Hence, the publisher can obtain the user's identifier from the watermarks by deducing the user's identifier from one or more watermarks that have been inserted into various segments of the personalized data stream. To deduce the user's identifier, the publisher can perform another XOR operation between a watermark and a segment of the data stream from which the watermark was generated. The publisher can then use this user identifier to determine personal identifying information for the user (operation 508).

Data Broker

A data broker can include any online service that controls access to digital content. For example, a large set of users may have registered with the broker to obtain digital content by either purchasing the digital content, renting the digital content, paying for a subscription to access the digital content, or by agreeing to view periodic advertisements in exchange for access to the digital content. Publishers can sell their digital content to the broker, or can engage in a business arrangement with the broker. The broker can use a publisher's digital content to generate revenue, and can return a pre-negotiated portion of this revenue to the publisher. This allows publishers, regardless of their monetary or business resources, to earn money from their digital content by leveraging the broker's access to advertisers and paying consumers.

In some embodiments, the data broker and the publisher can reside on the same system. For example, a publisher can deploy a data-brokering service to control access to their digital content, and to control how this digital content is leveraged to earn revenue. Some digital content can be broadcasted for free and without commercials, while other digital streams require consumers to pay for the content and/or to view commercials and product placements within the digital content.

Figure 6:
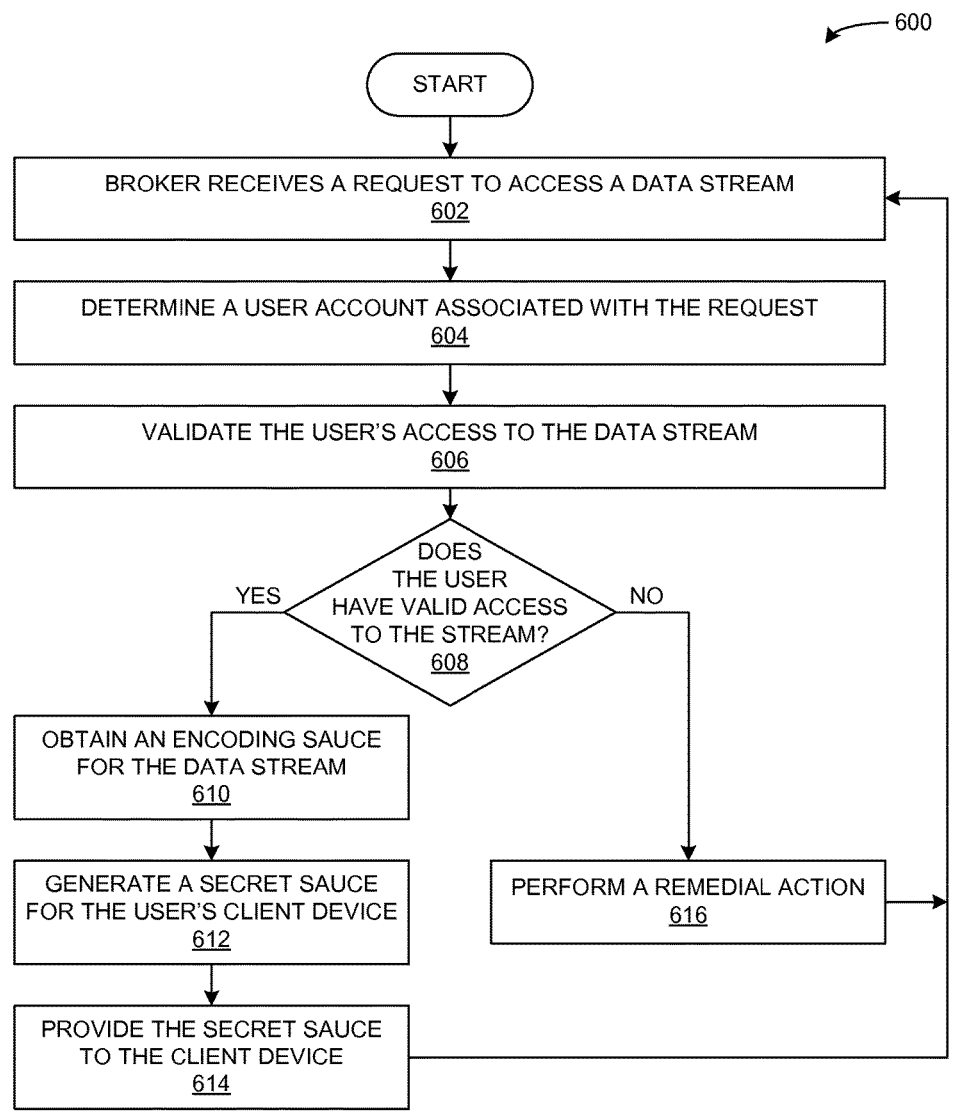
FIG. 6 presents a flow chart illustrating a method for processing a request for access to a data stream in accordance with an embodiment.

FIG. 6 presents a flow chart illustrating a method 600 for processing a request for access to a data stream in accordance with an embodiment. During operation, the broker can receive a request from a user's client device for accessing a data stream (operation 602). The request can include an Interest for a secret sauce stream that corresponds to a portion of an encoded data stream, and can include the client device's public key. The client device and broker device can also exchange transaction messages, for example, to validate the client device's authentication information for a pre-paid media stream, to pay for a pay-per-view style media stream, to transfer an advertising token to the broker device, etc.

The broker then determines a user account associated with the request (operation 604), and validates the user's access to the data stream (operation 606). The user can have valid access to the data stream when the user has paid to receive the data stream, such as by purchasing a movie, subscribing to a video streaming service, or by purchasing or subscribing to any other digital content (e.g., subscribing to a news website, purchasing a software application, etc.). In some other embodiments, the data stream can include a live or pre-recorded media stream, such as a movie, a television show, or a music stream. Alternatively, if the user has not purchased the data stream (e.g., a media stream), the user can be allowed access to the data stream when the user has viewed a sufficient number of commercials or advertisements.

The broker then determines whether the user has valid access to the data stream (operation 608). If so, the broker can obtain an encoding sauce that corresponds to the encoded data stream, either from a local repository or from the publisher (operation 610). The broker uses the encoding sauce to generate a secret sauce for the user's client device (operation 612), and provides the secret sauce to the user's client device. The client device can use this secret sauce to process the encoded data stream to generate a personalized data stream. In some embodiments, the broker does not need to generate a unique secret sauce from the base sauce. For example, some encoded data streams might not need a secret sauce to decode the stream. Hence, the broker can forward the encoding sauce to a client device during operation 614, which allows the client device to process the encoded data stream to reproduce the original data stream (whose contents are not personalized for the client device).

In some embodiments, if the user does not have valid access to the data stream, the broker can perform a remedial action (operation 616). For example, if the data stream needs to be purchased, the broker can provide the user with a user interface that allows the user to pay for the data stream's contents. If the data stream requires a subscription to a streaming service, such as a movie or music streaming service, the broker can provide the user with an option to log into the streaming service as a way to validate that the user is a subscribed member. Alternatively, the broker can present the user with an interface for subscribing to the streaming service.

In some embodiments, the user can be given advertising tokens (credits) to access digital content by viewing advertisements, such as by viewing a media stream that presents a commercial to the user. Each advertiser can bid to display advertisements to the user, and can pay for a number of advertising tokens that can be issued to the user. This way, an advertiser can reduce the number of other advertisers with which it needs to share a given commercial break. The user is more likely to remember the advertisement if the user did not need to view additional advertisements before being allowed to continue viewing a movie or listening to music. Hence, during operation 608, the broker can determine whether the user possesses a sufficient number of advertising tokens to gain access to a portion of an encoded data stream. If so, the broker can proceed through operations 610-614 to provide the user's client device with a secret sauce that allows the client device to present the next portion of the encoded media stream to the user.

However, if the user has not obtained a sufficient number of advertising tokens, the broker can provide a set of advertisements to the user that together provide the user with the sufficient number of advertising tokens. The broker can then return to operation 602. Once the client device has received the advertisements, and the broker has validated that these advertisements have been streamed to the client device, the broker can accept another request to access the next portion of the encoded media stream from the client device.

Figure 7:
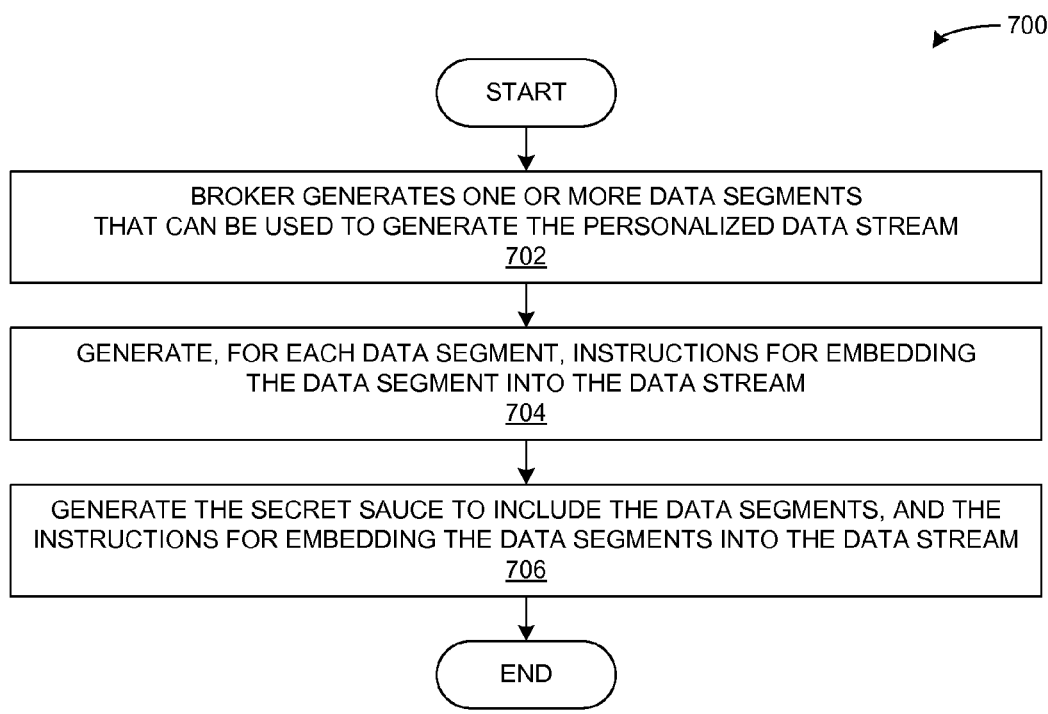
FIG. 7 presents a flow chart illustrating a method for generating a secret sauce for a user's client device in accordance with an embodiment.

FIG. 7 presents a flow chart illustrating a method 700 for generating a secret sauce for a user's client device in accordance with an embodiment. During operation, the broker can generate one or more data segments that can be used to produce the personalized data stream (operation 702). The broker then generates, for each data segment, instructions for embedding the data segment into the data stream (operation 704). These instructions can include, for example, instructions for inserting the data segment into the data stream, or for encoding the data segment into existing portions of the data stream. The broker then generates the secret sauce to include the data segments and the instructions (operation 706).

Client Device

A client device can interact with a publisher and a data broker to provide digital content to a local user. For example, a user can browse through a web page hosted by a publisher, or can view movies or listen to music hosted by the publisher. However, the digital content received from the publisher (or from any caches in the network) may be in an encoded or corrupted form. To present the digital content to the local user, the client device needs to obtain secret sauce objects from the broker, which may require the user to pay for access to the digital content, or to view advertisements within or in addition to the digital content.

In some embodiments, the client device can include a data publisher, and data-brokering capabilities. For example, a user can use a personal computing device, tablet computer, or cell phone to generate digital content (e.g., a video file, an audio file, or a document). The user's computing device can encode this digital content, and can broker which local users or which remote devices can have access to the digital content.

Figure 8:
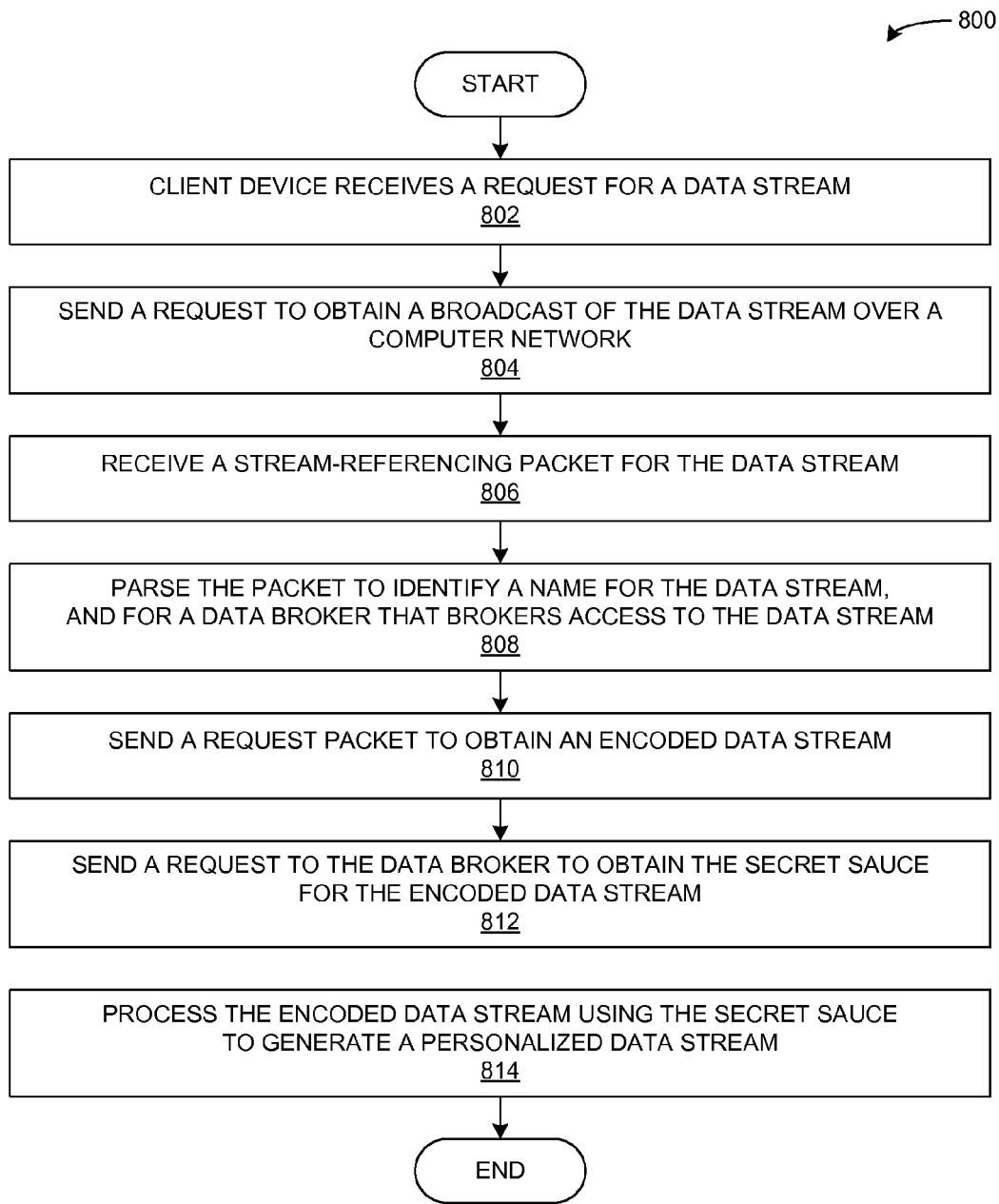
FIG. 8 presents a flow chart illustrating a method for generating a personalized data stream at a client device for a local user in accordance with an embodiment.

FIG. 8 presents a flow chart illustrating a method 800 for generating a personalized data stream at a client device for a local user in accordance with an embodiment. During operation, the client device can receive a request for a data stream (operation 802), such as from a client application that is to present or provide the data stream to the user. The client device then sends a network request to obtain a broadcast of the data stream over a computer network (operation 804). In some embodiments, the request can include an Interest message that indicates a name for the data stream, and can be disseminated over a named-data network. The client device then receives a stream-referencing packet for the data stream (operation 806).

The stream-referencing packet can indicate a link (e.g., URL) or name (e.g., an NDN name) for downloading the encoded data stream over an information-centric network or over a peer-to-peer computer network, as well as a link or name for downloading or obtaining the secret sauce from the broker. In some other embodiments, the data stream may be broken down into a plurality of packets, and the stream-referencing packet can include an initial packet of the data stream. The stream-referencing packet can include a header that indicates links or names for one or more brokers.

The client device then parses the stream-referencing packet to identify a link or name for the data stream, and to identify a link or name for a data broker that brokers access to the data stream (operation 808). The client device sends a request packet to obtain an encoded data stream (operation 810), and sends another request to the data broker to obtain a secret sauce stream for the data stream (operation 812).

The client device then processes the encoded data stream using the secret sauce stream to generate a personalized data stream for the local user (operation 814). For example, the client device can process the encoded data stream by inserting watermarks from the secret sauce stream into locations of the encoded data stream indicated by the secret sauce stream. Alternatively, the secret sauce stream can include instructions for generating the watermark, which the client device uses to generate one or more watermarking data segments that are inserted into the encoded data stream. These watermark-generating instructions may indicate operations for encoding a unique identifier of a local user into data segments provided in the secret sauce stream, or into data segments of the encoded data stream.

The client device can also execute any other instructions from the secret sauce, such as to present an advertisement or to perform analytics-related computations. These instructions can configure the client device to send out a request or an Interest for an advertisement, which can be processed by the broker or a third-party advertising network to provide an advertisement to the client device. The advertisement may be selected so that it is relevant to the data stream being consumed by the user, or so that it is relevant to the user's personal interests. These instructions can also configure the client device to pause playback of a media stream, present one or more short media segments (e.g., an advertisement), and resume playback after presenting the short media segments.

These instructions can also configure the client device to embed or overlay an image or media segment into the media stream. For example, a movie may include an image of a soda bottle with a label. The label in the original media stream may be for a generic brand, or for a brand that paid for product placement into the movie while the movie was being presented at movie theaters. However, once the movie enters the video-rental market, other advertisers may pay to have their brand's label overlaid into the movie for a pre-negotiated number of times, and/or for a predetermined audience demographic. Hence, the instructions from the secret sauce can configure the client device to overlay an image or a media segment over one or more frames of the media stream so that the second brand's label is displayed on top of the bottle's initial label. These instructions can indicate an image and frame coordinate for each frame of the media stream, which the client device uses to overlay these images onto the media stream so that the brand's label can shift and animate along with the bottle. These instructions can also replace or overlay audio segments within the media stream, for example, to replace a verbal mention of one brand with the verbal mention of the second brand that is to be advertised to the local user.

Figure 9A:
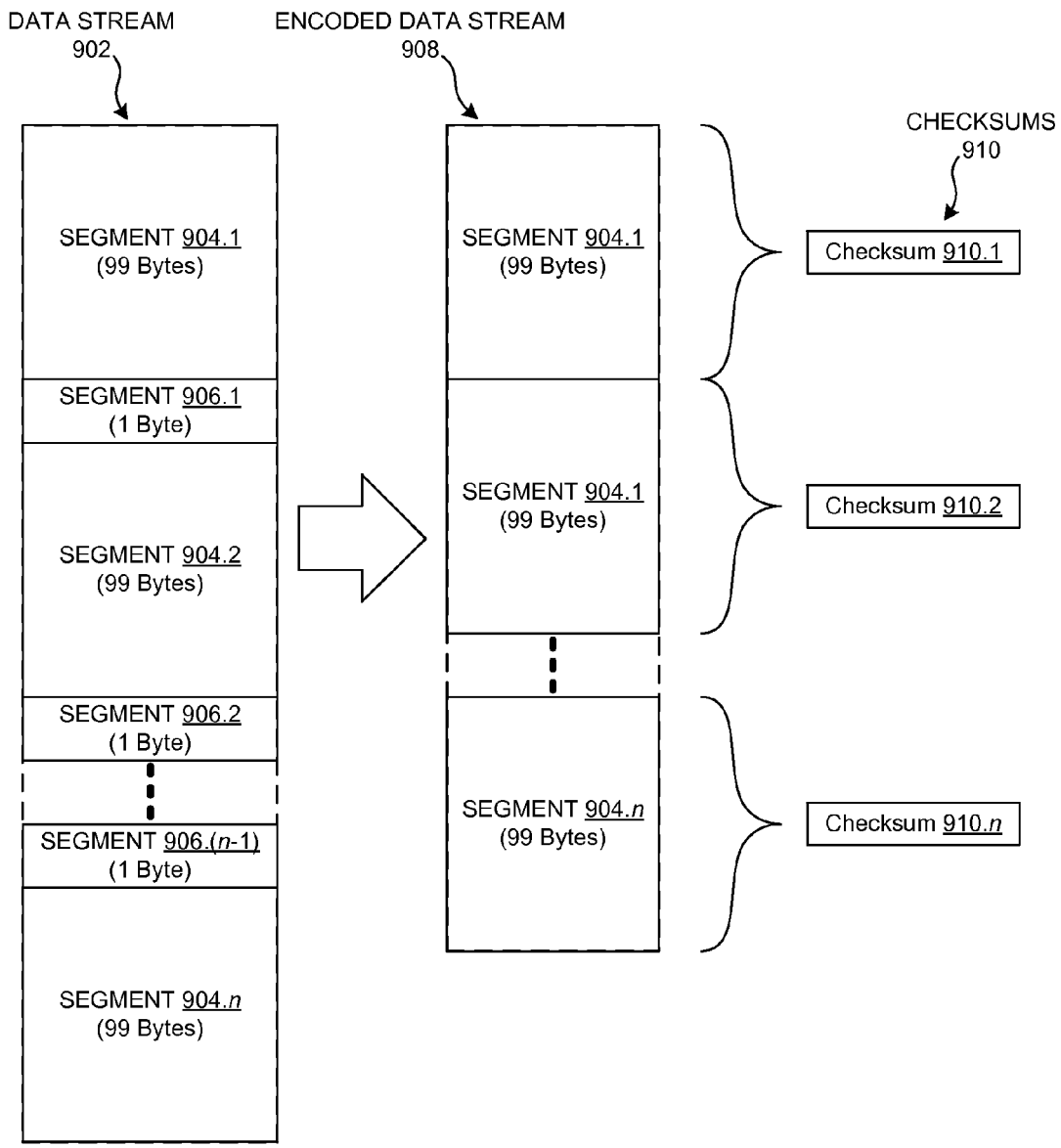
FIG. 9A illustrates an encoded data stream and a set of checksums which have been generated from a base data stream in accordance with an embodiment.

FIG. 9A illustrates an encoded data stream 908 and a set of checksums 910 which have been generated from a base data stream 902 in accordance with an embodiment. Specifically, a publisher can encode data stream 902 by removing small portions of the data stream so that the encoded data stream no longer includes sufficient information for reproducing or otherwise making use of the data stream's contents. For example, the publisher can remove a predetermined percentage of bits from data stream 902 (e.g., one percent) by extracting segments 906 from data stream 902, and generating encoded data stream 908 to include the remaining data segments 904. The publisher can upload encoded data stream 908 to a content server, and can provide encoded data stream 908 to network devices and client devices across an information-centric network.

In some embodiments, each of data segments 906 can be of equal size, and can be evenly distributed across data stream 902. In some other embodiments, segments 904 together are approximately equal to the predetermined percentage of data stream 902, and each of segments 904 can be obtained from portions of data stream 902 that are critical to reproducing the data stream's contents (e.g., from I frames of a video file). Alternatively, the publisher can randomly select individual bits or data blocks (e.g., byte segments) to extract from random locations of the data stream 902 so that a predetermined percentage of data stream 902 is extracted to generate encoded data stream 908.

The publisher can also generate checksums 910 for encoded data stream 908, such that each checksum 910 corresponds to a segment 904 of encoded data stream 908. The publisher can send checksums 910 to a broker, either within an encoding sauce, or in addition to the encoding sauce. The broker can use checksums 910 to generate a checksum for each personalized data stream (or for a portion of the personalized data stream) that the broker generates for each client device that has valid access to receive data stream 902. Also, the publisher can generate the encoding sauce to include segments 906, along with instructions for re-inserting segments 906 into the personalized data stream, and instructions for generating and inserting one or more watermarks into the personalized data stream.

Figure 9B:
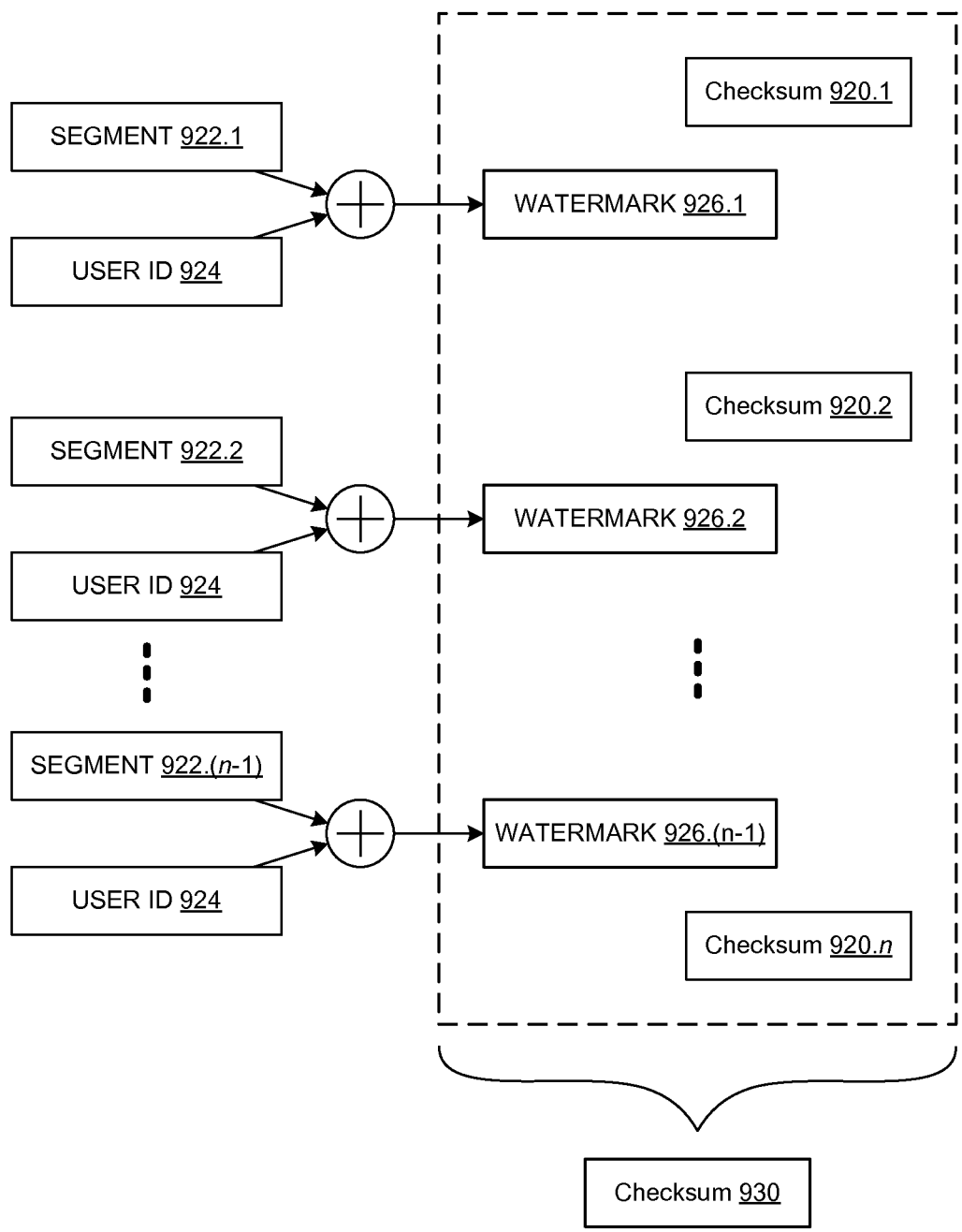
FIG. 9B illustrates a set of watermarks computed for a personalized data stream, and a checksum computed from multiple checksums for a base data stream and from watermarks in accordance with an embodiment.

FIG. 9B illustrates a set of watermarks 926 computed for a personalized data stream, and a checksum 930 computed from multiple checksums 920 and watermarks 926 in accordance with an embodiment. Specifically, the broker can receive an encoding sauce that includes checksums 920 for segments of an encoded data stream, includes data segments 922 that have been extracted from a base data stream, and instructions for modifying segments 922 to generate a plurality of watermarks 926.

In some embodiments, the encoding sauce's instructions can indicate that the broker is to generate each watermark 926 by using a user ID 924 and a predetermined function to modify each data segment 922. For example, the broker can generate each watermark 926 by performing a bitwise operation (e.g., an exclusive OR (XOR) operation) between each data segment 922 and user ID 924, by performing an arithmetic operation, or performing any other operation now known or later developed. User ID 924 can indicate any unique identifier for a user that has requested access to the data stream, such as a unique numeric identifier, an account name or number, an email address, or any other identifier type now know or later developed.

Once the broker has generated the set of watermarks 926 that are to be inserted into a user's personalized data stream, the broker can compute a checksum for the personalized data stream itself. Recall that broker can receive checksums 920 from the publisher, such that checksums 920 correspond to the data segments in the encoded data stream. Hence, the broker can compute the checksum for the personalized data stream based on checksums 920, along with watermarks 926 that are to be inserted into the personalized data stream.

The broker then generates a secret sauce that includes watermarks 926, checksum 930, as well as the instructions from the publisher's encoding sauce that indicate how watermarks 926 are to be inserted into the personalized data stream.

Figure 9C:
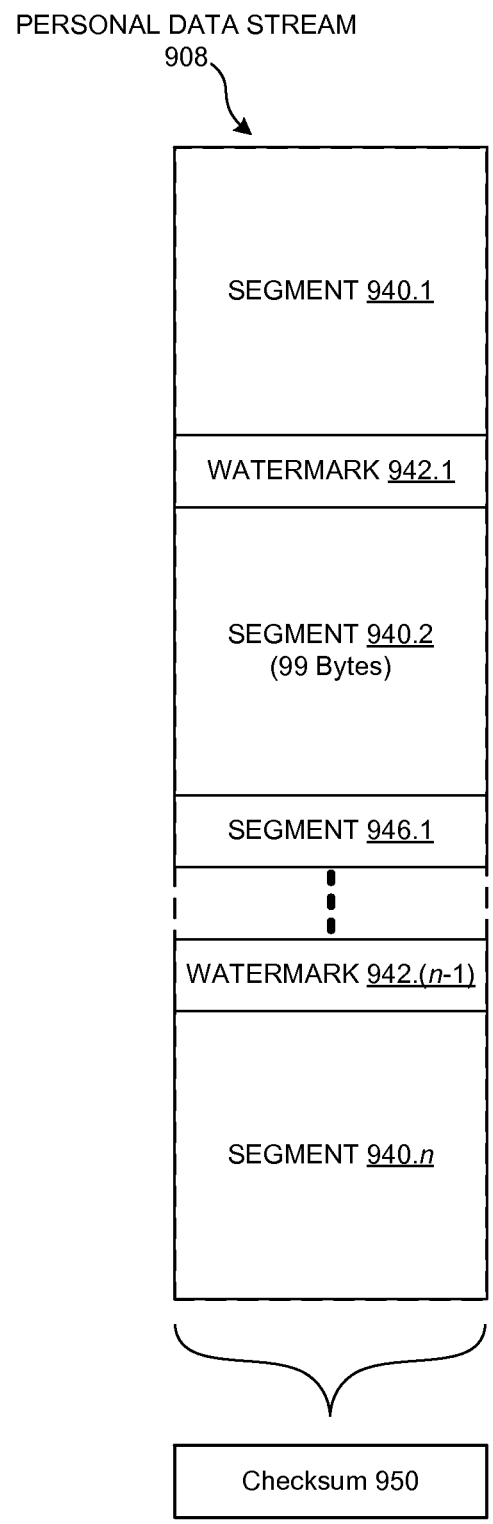
FIG. 9C illustrates a personalized data stream, and a checksum computed from personalized data stream in accordance with an embodiment.

FIG. 9C illustrates a personalized data stream 940 and a checksum 950 computed from personalized data stream 940 in accordance with an embodiment. Specifically, a client device can receive an encoded data stream from a publisher (and/or from any ICN device which has cached the encoded data stream), and can receive a secret sauce stream from a broker for the data stream. The client device can obtain or compute watermarks 944 and data segments 946 from the secret sauce stream, and can use instructions in the secret sauce stream to generate personalized data stream 940 by inserting watermarks 944 and/or data segments 946 into specific sections of the encoded data stream. The client device can also compute checksum 950 for the personalized data stream, and can compare checksum 950 to a checksum in the secret sauce to verify the integrity of the personalized data stream.

Multi-Tiered Brokers

In some embodiments, a broker can generate a secret sauce for other sub-brokers. Each broker generates an encoding sauce by signing and stamping the encoding sauce, and inserting an identifier for a sub-broker into the encoding sauce. For example, a top-level broker (or a mid-level broker) can generate the encoding sauce to include a watermark for a sub-broker, and to include an encoding sauce for the sub-broker. The top-level broker then signs the encoding sauce before sending the encoding sauce to a sub-broker. The sub-broker can use the encoding sauce to generate a secret sauce for a client device, or to generate an encoding sauce for another sub-broker.

A sub-broker can generate a secret sauce that includes the watermarks from the parent broker's encoding sauce (e.g., watermarks for the local sub-broker, and other higher-level brokers), as well as additional watermarks for the client device. Hence, when the client device processes the encoded data stream using the secret sauce, the client device generates the personalized data stream by inserting watermarks for one or more brokers and for the client device into various locations of the personalized data stream as indicated by the secret sauce.

Figure 10:
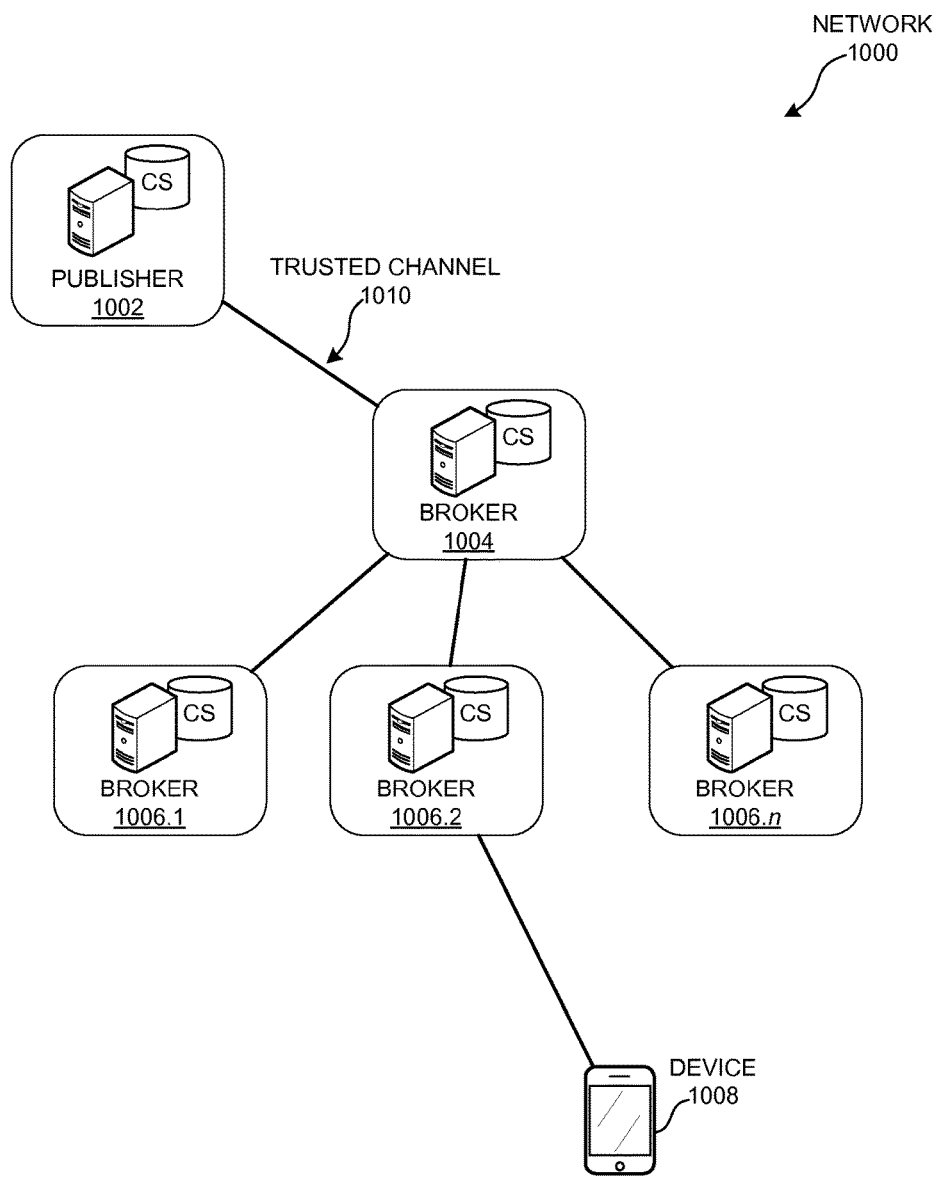
FIG. 10 illustrates a hierarchy of brokers in accordance with an embodiment.

FIG. 10 illustrates a hierarchy of brokers in accordance with an embodiment. Network 1000 can include one or more publishers 1002 that publish one or more data streams by providing an encoding sauce to a top-level broker 1004 for each data stream. Top-level broker 1004 can assign a sub-broker 1006 to each data stream by generating another encoding sauce for the sub-broker (e.g., sub-broker 1006.2), and providing the encoding sauce to the sub-broker.

Recall that when a client device 1008 requests a data stream from publisher 1002, publisher 1002 can return a packet that indicates a name for the data stream, and indicates a name for the data stream's secret sauce stream. This allows client device 1008 to obtain packets for the data stream and for the secret sauce stream from devices across an information-centric network. In some embodiments, when top-level broker 1004 sends an encoding sauce for a data stream to sub-broker 1006.2, sub-broker 1006.2 advertises that it can generate and return a secret sauce stream for this data stream. Hence, when client device 1008 disseminates a request or an Interest for a secret sauce packet that corresponds to the data stream, this request or Interest can flow to broker 1006.2 over the information-centric network.

Figure 11:
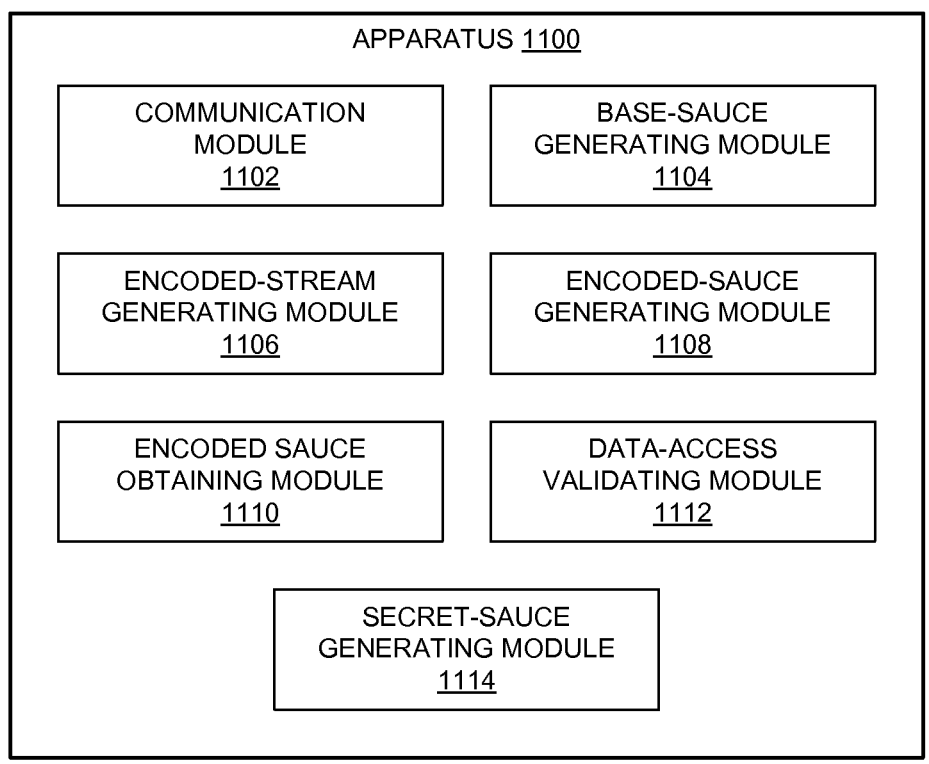
FIG. 11 illustrates an exemplary apparatus that facilitates brokering access to digital content in accordance with an embodiment.

FIG. 11 illustrates an exemplary apparatus 1100 that facilitates brokering access to digital content in accordance with an embodiment. Apparatus 1100 can comprise a plurality of modules which may communicate with one another via a wired or wireless communication channel. Apparatus 1100 may be realized using one or more integrated circuits, and may include fewer or more modules than those shown in FIG. 11. Further, apparatus 1100 may be integrated in a computer system, or realized as a separate device which is capable of communicating with other computer systems and/or devices. Specifically, apparatus 1100 can comprise a communication module 1102, a base-sauce generating module 1104, an encoded-stream generating module 1106, an encoding-sauce generating module 1108, an encoding-sauce obtaining module 1110, a data-access validation module 1112, and a secret-sauce generating module 1114.

In some embodiments, communication module 1102 can receive an Interest or request for a data stream, or for a secret sauce stream for an encoded data stream. Base-sauce generating module 1104 can generate a base sauce for encoding a data stream, and encoded-stream generating module 1106 can process the data stream using the base sauce to generate the encoded data stream. Encoding-sauce generating module 1108 can generate an encoding sauce that indicates instructions for generating a data-decoding secret sauce for a target entity.

Encoding-sauce obtaining module 1110 can receive a decoding sauce from a remote device, such as from a remote publisher. Data-access validating module 1112 can process an Interest or request for the data stream's secret sauce to determine whether the target entity has valid access to the data stream. Secret-sauce generating module 1114 can generate the secret sauce for the target entity responsive to data-access validating module 1112 validating the target entity's access to the data stream.

Figure 12:
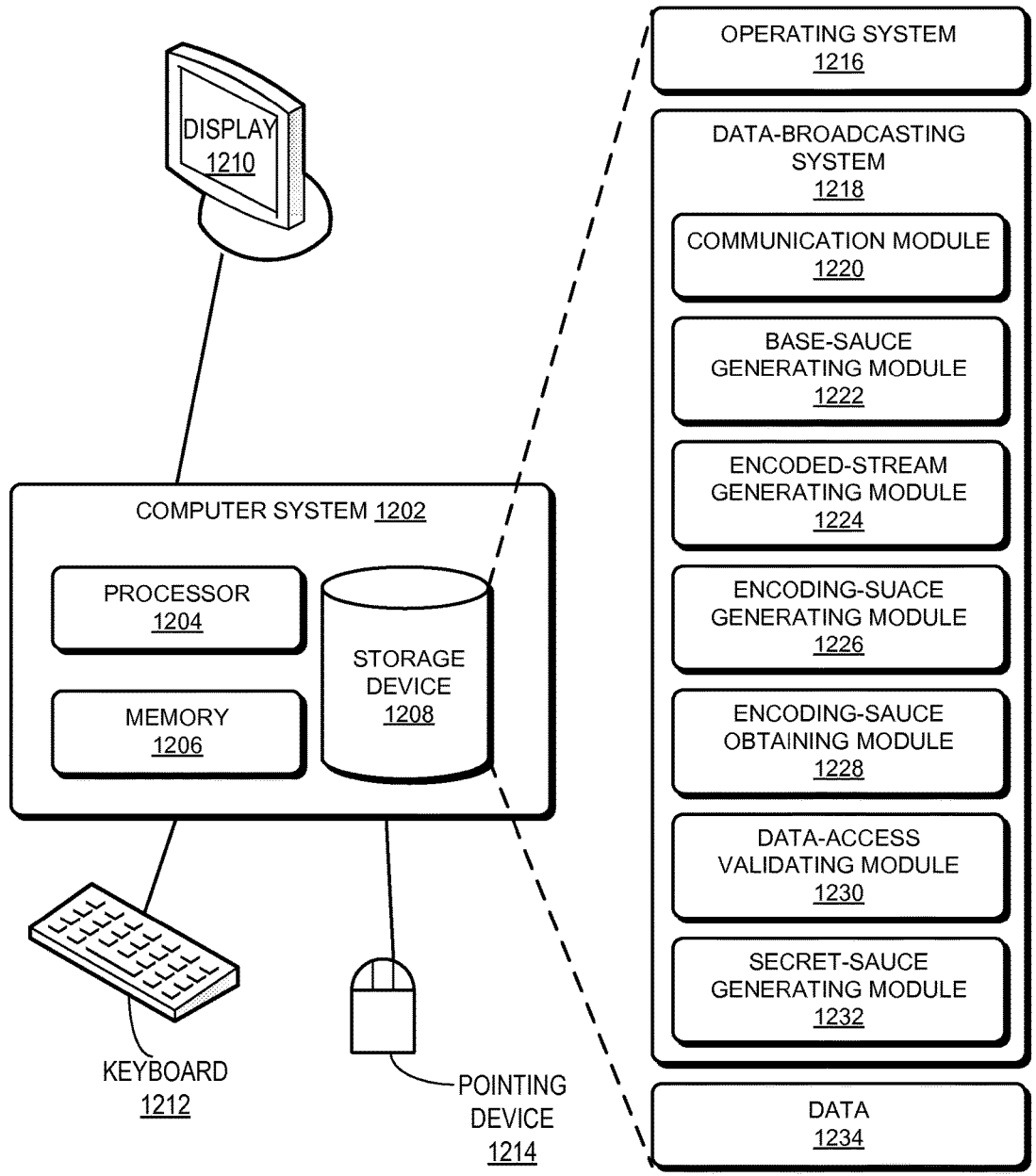
FIG. 12 illustrates an exemplary computer system that facilitates brokering access to digital content in accordance with an embodiment.

FIG. 12 illustrates an exemplary computer system 1202 that facilitates brokering access to digital content in accordance with an embodiment. Computer system 1202 includes a processor 1204, a memory 1206, and a storage device 1208. Memory 1206 can include a volatile memory (e.g., RAM) that serves as a managed memory, and can be used to store one or more memory pools. Furthermore, computer system 1202 can be coupled to a display device 1210, a keyboard 1212, and a pointing device 1214. Storage device 1208 can store operating system 1216, a data-broadcasting system 1218, and data 1234.

Data-broadcasting system 1218 can include instructions, which when executed by computer system 1202, can cause computer system 1202 to perform methods and/or processes described in this disclosure. Specifically, data-broadcasting system 1218 may include instructions for receiving an Interest or request for a data stream, or for a secret sauce stream for an encoded data stream (communication module 1220). Further, data-broadcasting system 1218 can include instructions for generating a base sauce for encoding a data stream (base-sauce generating module 1222), and can also include instructions for processing the data stream using the base sauce to generate the encoded data stream (encoded-stream generating module 1224).

Data-broadcasting system 1218 can include instructions for generating an encoding sauce that indicates instructions for generating a data-decoding secret sauce for a target entity (encoding-sauce generating module 1226). Data-broadcasting system 1218 can also include instructions for receiving a decoding sauce from a remote device, such as from a remote publisher (encoding-sauce obtaining module 1228).

Further, data-broadcasting system 1218 can include instructions for processing an Interest or request for the data stream's secret sauce to determine whether the target entity has valid access to the data stream (data-access validating module 1230). Data-broadcasting system 1218 can also include instructions for generating the secret sauce for the target entity responsive to determining that the target entity has valid access to the data stream (secret-sauce generating module 1232).

Data 1234 can include any data that is required as input or that is generated as output by the methods and/or processes described in this disclosure. Specifically, data 1234 can store at least a base sauce for encoding a base data stream, and an encoding sauce for the data stream. Data 1234 can also include the base data stream (e.g., a media stream), packets or Content Objects for the encoded data stream, and/or packets or Content Objects for a secret sauce stream corresponding to a target entity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
at a publisher device:
  extracting segments from a data stream, to produce an encoded stream;
  generating decode instructions that indicate where to re-insert the extracted segments into the encoded stream, and watermark instructions that indicate how to generate watermarks and where to insert the watermarks into the data stream or the encoded stream to produce a personalized data stream;
  sending to a broker device the extracted segments, the decode instructions, and the watermark instructions; and
  upon receiving a request for the data stream from a client device, providing to the client device the encoded stream and directing the client device to the broker device; and
at the broker device:
  receiving from the client device a request for information corresponding to the data stream, the request including a client identifier;

encoding some of the extracted segments with the client identifier based on the watermark instructions, to produce the watermarks; and sending to the client device the information including the extracted segments, the decode instructions, the watermarks, and the watermark instructions, to enable the client device to recover the data stream using the decode instructions and insert the watermarks into the data stream or the encoded stream using the watermark instructions to produce the personalized stream.

2. The computer-implemented method of claim 1, wherein, at the publisher device:

the extracting includes extracting spaced segments from the data stream; and the generating includes generating the decode instructions to map each extracted segment to an offset in the encoded stream.

3. The computer-implemented method of claim 1, wherein, at the broker device:

the encoding some of the extracted segments includes XORing the extracted segments each with the client identifier, to produce the watermarks.

4. The computer-implemented method of claim 3, further comprising, at the broker device:

authorizing the client device based on the client identifier before performing the encoding and the sending to the client device.

5. The computer-implemented method of claim 1, further comprising, at the client device:

upon receiving the information including the extracted segments, the decode instructions, the watermarks, and the watermark instructions:

inserting the extracted segments into the encoded stream based on the decode instructions to recover the data stream; and inserting the watermarks into the data stream or the encoded stream based on the watermark instructions, to produce the personalized stream.

6. The computer-implemented method of claim 1, further comprising, at the client device:

upon receiving the information including the extracted segments, the decode instructions, the watermarks, and the watermark instructions, inserting the watermarks into the data stream or the encoded stream based on the watermark instructions, to produce the personalized stream.

7. The computer-implemented method of claim 6, further comprising, at the publisher device:

receiving a request to identify the client device; and
processing the personalized data stream based on the watermarking instructions to detect the client identifier from the watermarks in the personalized data stream.

8. The computer-implemented method of claim 1, wherein:

the publisher device and the client device are configured to communicate with each other over an information centric network (ICN) using Interests to request data by name and content objects that carry and name the data that satisfy the Interests; and at the publisher device:

the receiving the request for the data stream from the client device includes receiving, from the client device over the ICN, an Interest naming the data stream; and the providing includes providing, to the client device over the ICN, a content object naming the data stream and indicating a source for the data stream.

9. The computer-implemented method of claim 8, wherein:

the broker device and the client device are configured to communicate with each other over the ICN using Interests to request data by name and content objects that carry and name the data that satisfy the Interests; and at the broker device:

the receiving the request for the information corresponding to the data stream from the client device includes receiving, from the client device over the ICN, an Interest naming the data stream; and the sending includes sending, to the client device over the ICN, content objects carrying the information.

10. The computer-implemented method of claim 1, wherein the data stream includes one or more of an audio stream and a video stream.

11. A system comprising:

a publisher device configured to perform:

extracting segments from a data stream, to produce an encoded stream;

generating decode instructions that indicate where to re-insert the extracted segments into the encoded stream, and watermark instructions that indicate how to generate watermarks and where to insert the watermarks into the data stream or the encoded stream to produce a personalized data stream;

sending to a broker device the extracted segments, the decode instructions, and the watermark instructions; and upon receiving a request for the data stream from a client device, providing to the client device the encoded stream and directing the client device to the broker device; and the broker device configure to perform:

receiving from the client device a request for information corresponding to the data stream, the request including a client identifier;

encoding some of the extracted segments with the client identifier based on the watermark instructions, to produce the watermarks; and sending to the client device the information including the extracted segments, the decode instructions, the watermarks, and the watermark instructions, to enable the client device to recover the data stream using the decode instructions and insert the watermarks into the data stream or the encoded stream using the watermark instructions to produce the personalized stream.

12. The system of claim 11, wherein the publisher device is configured to perform:

the extracting by extracting spaced segments from the data stream; and the generating by generating the decode instructions to map each extracted segment to an offset in the encoded stream.

13. The system of claim 11, wherein the broker device is configured to perform:

the encoding some of the extracted segments by XORing the extracted segments each with the client identifier, to produce the watermarks.

14. The system of claim 13, wherein the broker device is further configured to perform:

authorizing the client device based on the client identifier before performing the encoding and the sending to the client device.

15. The system of claim 11, wherein the client device is further configured to perform:
   upon receiving the information including the extracted segments, the decode instructions, the watermarks, and the watermark instructions:
      inserting the extracted segments into the encoded stream based on the decode instructions to recover the data stream; and
      inserting the watermarks into the data stream or the encoded stream based on the watermark instructions, to produce the personalized stream.

16. The system of claim 11, wherein the client device is further configured to perform:
   upon receiving the information including the extracted segments, the decode instructions, the watermarks, and the watermark instructions, inserting the watermarks into the data stream or the encoded stream based on the watermark instructions, to produce the personalized stream.

17. The system of claim 16, wherein the publisher device is further configured to perform:
   receiving a request to identify the client device; and
   processing the personalized data stream based on the watermarking instructions to detect the client identifier from the watermarks in the personalized data stream.

18. A computer-implemented method comprising:
   at a publisher device:
      extracting segments from a data stream, to produce an encoded stream;
      generating decode instructions that indicate where to re-insert the extracted segments into the encoded stream, and watermark instructions that indicate how to generate watermarks and where to insert the watermarks into the data stream or the encoded stream to produce a personalized data stream;
      sending to a broker device the extracted segments, the decode instructions, and the watermark instructions; and
      upon receiving a request for the data stream from a client device, providing to the client device the encoded stream and directing the client device to the broker device; and
   at the broker device:
      receiving from the client device a request for information corresponding to the data stream, the request including a client identifier;
      encoding some of the extracted segments with the client identifier based on the watermark instructions, to produce the watermarks; and
      sending to the client device the information including the extracted segments, the decode instructions, and the watermark instructions, to enable the client device to recover the data stream using the decode instructions, and generate the watermarks and insert the watermarks into the data stream or the encoded stream using the watermark instructions to produce the personalized stream.

19. The system of claim 18, wherein, at the publisher device:
   the extracting includes extracting spaced segments from the data stream; and
   the generating includes generating the decode instructions to map each extracted segment to an offset in the encoded stream.

20. The system of claim 18, wherein the data stream includes one or more of an audio stream and a video stream.

* * * * *